United States Patent [19]
Anderson

[11] 3,898,038
[45] Aug. 5, 1975

[54] METHOD AND APPARATUS FOR STERILIZING A BIOLOGICALLY CONTAMINATED ENCLOSURE

[75] Inventor: Eugene L. Anderson, San Antonio, Tex.

[73] Assignee: Southwest Research Institute, San Antonio, Tex.

[22] Filed: Dec. 13, 1973

[21] Appl. No.: 424,558

[52] U.S. Cl. .................. 21/58; 21/108; 21/122; 21/126; 423/210; 423/245
[51] Int. Cl.² ... A61L 13/02; A61L 3/00; B01J 8/02; B01D 53/06
[58] Field of Search ............... 21/53, 58, 108–127; 423/210, 245

[56] References Cited
UNITED STATES PATENTS
3,694,146  9/1972  Roy et al. ................... 21/110 X
3,796,541  3/1974  Gentil ........................ 21/110

Primary Examiner—Morris O. Wolk
Assistant Examiner—Roger F. Phillips
Attorney, Agent, or Firm—Fulbright & Jaworski

[57] ABSTRACT

A method and apparatus system for sterilizing biologically contaminated enclosures such as hospital rooms and the like. The method includes the steps of releasing gaseous formaldehyde into the room or enclosure for contact with contaminants and neutralizing the formaldehyde by chemical reaction and physical adsorption. The system of apparatus includes means for vaporizing and dispersing formaldehyde into the enclosure for contact with contaminants, and neutralizer means for chemically reacting the dispersed formaldehyde and adsorbing the reaction products thereof.

12 Claims, 5 Drawing Figures

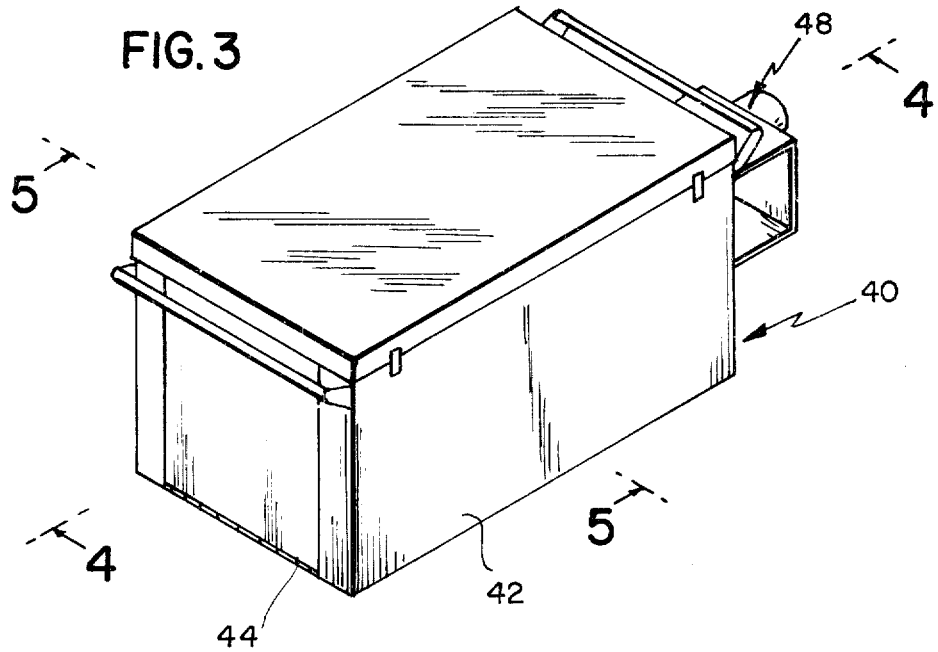
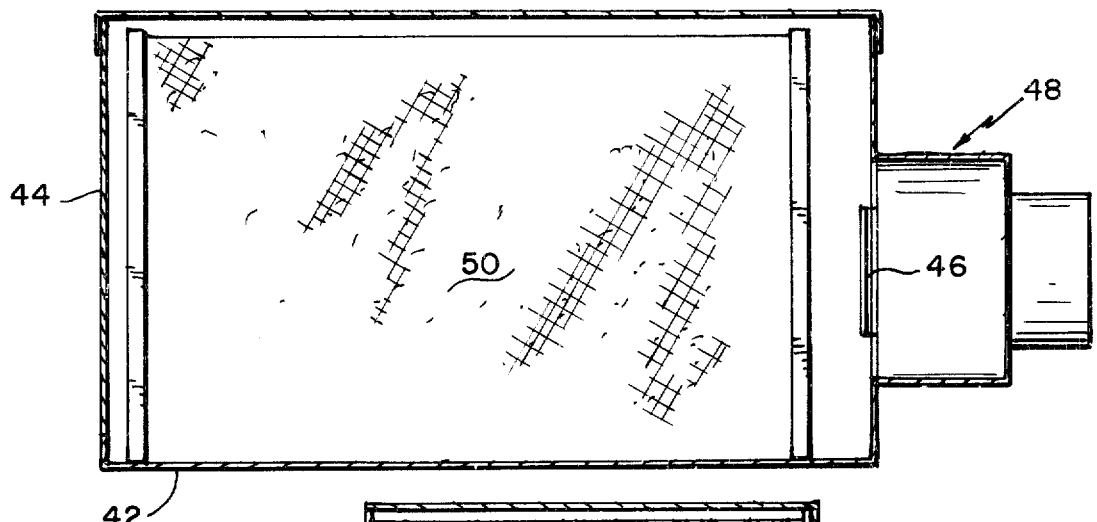
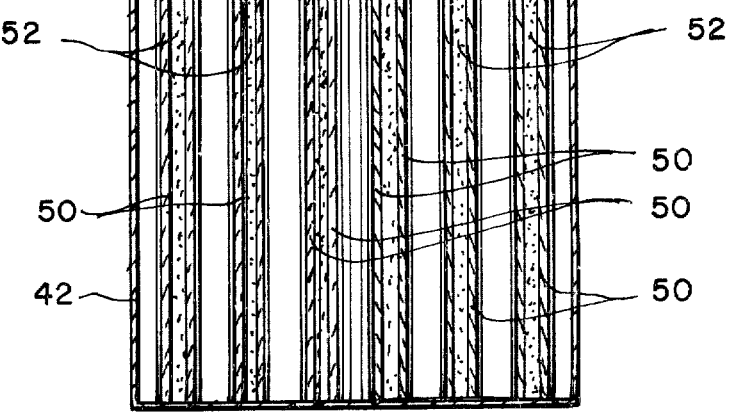

3,898,038

METHOD AND APPARATUS FOR STERILIZING A BIOLOGICALLY CONTAMINATED ENCLOSURE

BACKGROUND OF THE INVENTION

The invention herein described was made under a contract with the United States Department of the Army.

A variety of methods are currently in use for sterilizing hospital rooms and other enclosures contaminated with agents of infectious disease. Sterilization techniques are necessary in order to prevent the spread of communicable disease in a variety of medical treatment and research facilities.

Formaldehyde has long been recognized as an efficient and effective sterilizing agent but its use as such has been limited by inability to effect removal once it has been dispersed in an enclosure. Methods that have been used in attempts to remove formaldehyde include adsorption on solid surfaces, reaction and destruction of the formaldehyde molecules by chemical impregnants on solid adsorbents, absorption and absorption/reaction in various liquids, and by catalytic combustion techniques. However, owing to large volumes of air space in enclosures to be treated and absorption of formaldehyde and reaction products of formaldehyde on surfaces within the enclosures, conventional sterilization techniques have been of limited success. For example, treating of room surfaces with disinfectant solutions such as formalin is time consuming and requires diligent application to ensure thorough decontamination. Also, contaminated, highly sophisticated electronic equipment may be damaged by liquid agents. Thus, a need exists for a sterilizing technique that may be used in hospital rooms, clinics, research laboratories and other such enclosed facilities wherein relatively large air spaces may be sterilized completely and efficiently with minimum lapse of time to return the facilities to use. The present invention is directed to a method and apparatus system that provides these advantages.

SUMMARY

The present invention provides a method for releasing gaseous formaldehyde into a hospital room or similar enclosure for the purpose of biological decontamination or sterilization. Thereafter, the monomeric formaldehyde gas or vapor is removed from air in the enclosure by passing the air and formaldehyde mixture through a bed of materials comprising a heterogeneous mixture of an adsorbent material and a source of a co-reactant material. The adsorbent material consists of activated charcoal while the co-reactant material is an unstable ammonium compound or other source from which ammonia gas may be evolved to concentrate and react with formaldehyde on the charcoal surface.

The apparatus system of the present invention comprises means for vaporizing formaldehyde and dispersing it into the enclosure to be sterilized for contact with contaminants. A neutralizer means is provided for chemically reacting the dispersed formaldehyde and adsorbing the reaction products thereof.

It is, therefore, an object of the present invention to provide a method of sterilizing enclosures such as rooms in hospitals, clinics, research laboratories and the like by releasing gaseous formaldehyde into the enclosure for contact with contaminants and thereafter neutralizing the formaldehyde by chemical reaction and physical adsorption.

Another object of the present invention is the provision of such a method wherein the formaldehyde gas is generated by heating and vaporizing paraformaldehyde, and the formaldehyde thereafter is neutralized after performing its sterilizing function by circulation through a bed containing activated charcoal and an unstable ammonium compound or other ammonia source.

A still further object of the present invention is the provision of a system of apparatus for sterilizing a biologically contaminated enclosure including a means for vaporizing and dispersing formaldehyde into the enclosure and neutralizer means for chemically reacting the dispersed formaldehyde and adsorbing the reaction products thereof.

Other and further objects, features and advantages of the present invention are apparent from the abstract of the disclosure, the background of the invention, this summary, a brief description of the several views of the drawings, the description of the preferred embodiment and the claims.

BRIEF DESCRIPTION OF THE DRAWINGS

FIG. 3 is a perspective view of a neutralizer according to the present invention, FIG. 4 is a cross-sectional elevational view of the neutralizer taken along the line 4—4 of FIG. 3, and FIG. 5 is a cross-sectional side view of the neutralizer taken along the line 5—5 of FIG. 3.

DESCRIPTION OF THE PREFERRED EMBODIMENT

Figure 1:
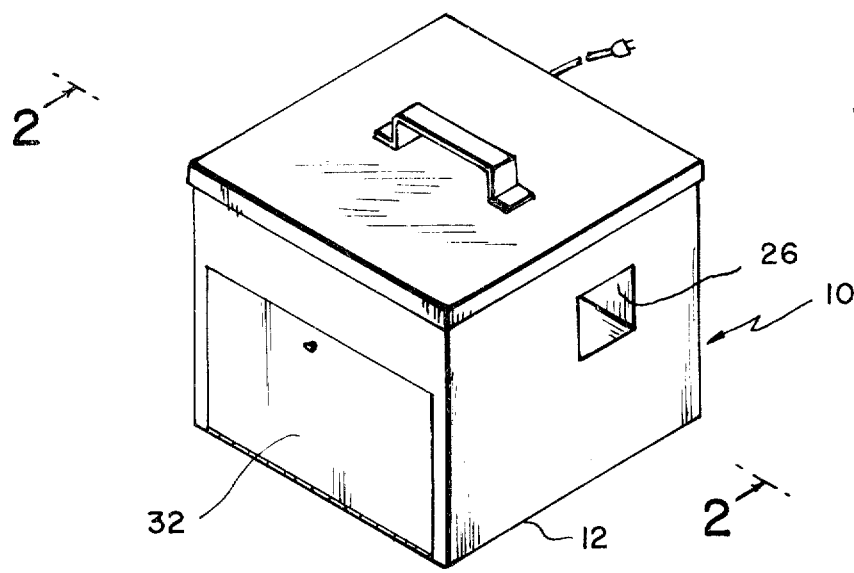
FIG. 1 is a perspective view of a vaporizer for generating and dispersing formaldehyde into an enclosure such as a room.

The method of sterilizing a biologically contaminated enclosure according to the present invention includes the steps of releasing gaseous formaldehyde into the enclosure for contact with the contaminants and thereafter neutralizing the formaldehyde by chemical reaction and physical adsorption. The preferred source of gaseous formaldehyde is paraformaldehyde and with reference now to the drawings, particularly FIGS. 1 and 2, a vaporizer assembly 10 is provided for purposes of vaporizing and dispersing the gaseous formaldehyde generated by heating of paraformaldehyde. The vaporizer 10 includes a plurality of walls defining a housing 12. A heating tray 14 is provided in the lower portion of the housing 12 as a receptacle for paraformaldehyde 16. Preferably, a screen 18 is placed over the tray 14 to prevent loss of paraformaldehyde. The tray 14 is provided with a suitable heating element 20 for the purpose of applying heat to the paraformaldehyde 16.

Figure 2:
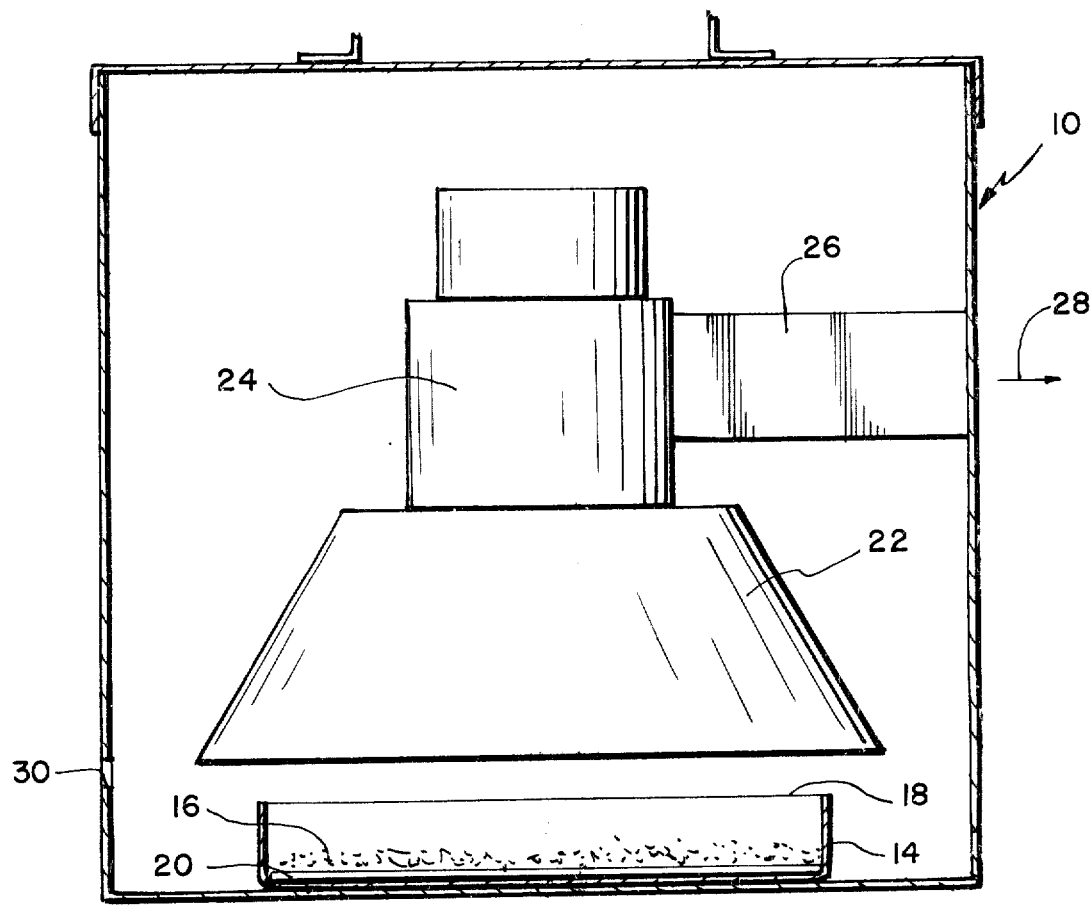
FIG. 2 is a cross-sectional elevational view of the vaporizer taken along the line 2—2 of FIG. 1.

Spaced above the tray 14 in the vaporizer housing 12 is a conical type hood 22 that collects formaldehyde vapors evolved from the tray 14 during heating of the paraformaldehyde. The hood 22 funnels the vapors to a blower means 24 having a conduit 26 leading to the exterior of the housing 12. Thus, formaldehyde vapor is forced out of the housing 12 as indicated by the arrow 28. A draft through the vaporizer assembly is accomplished by the provision of a plurality of holes in the housing 12, only one of which is shown in FIG. 2 as indicated by reference numeral 30.

The housing 12 of the vaporizer assembly 10 includes a door 32 that opens for access to the tray 14. Preferably, the tray 14 is mounted on slides or rollers in order that it may be withdrawn readily for loading or unloading of paraformaldehyde thereon.

In operation, paraformaldehyde 16 is placed on the tray 14 and the tray 14 is positioned under the hood 22 in the vaporizer 10. The heating element 20 is energized such that temperature to a maximum of 500° F. is obtained in the heating tray 14. As the paraformaldehyde 16 is heated, air from the room or enclosure being treated enters the housing 12 through the openings 30 and blends with formaldehyde vapors issuing from the tray 14, the air-formaldehyde mixture being collected by the hood 22 and dispersed or disseminated into the room or enclosure through the conduit 26 by means of the blower assembly 24.

After the requisite amount of formaldehyde has been dispersed in the room or enclosure, e.g., after about a two-hour period, the vaporizer 10 is shut off and after a sterilization period of one to five hours, neutralization of the formaldehyde is begun. With reference to FIGS. 3, 4 and 5 of the drawings, a neutralizer apparatus assembly 40 is illustrated having walls defining a housing 42. The housing is provided with an openable vapor inlet and outlet, the inlet opening being formed by a door 44 that opens to admit air and formaldehyde vapors to the interior of the neutralizer 40. The vapor outlet being formed by an inner blower closure 46, as best shown in FIG. 4, is downstream of a blower assembly 48 that communicates with the interior of the neutralizer 40.

Positioned within the housing 42 of the neutralizer 40 are at least one and preferably a plurality of vertically oriented screen panels 50 each containing a mixture of an unstable ammonium compound and activated charcoal. The mixture of the ammonium compound and activated charcoal in each panel is represented generally by the reference numeral 52 as best seen in FIG. 5. As shown in FIG. 4, the screen panels 50 are positioned in the housing 42 between the door 44 forming the vapor inlet and the inner blower closure 46.

By way of explanation of operation of the neutralizer assembly 40, the neutralizer is sealed and remains completely closed during operation of the vaporizer 10 as explained previously. Once the vaporizer operation and the sterilization period are concluded, the neutralizer 40 is actuated by opening the door 44 and inner blower closure 46, leading to the air outlet. Suitable solenoids as will be understood by those skilled in the art may be employed to actuate doors to provide the vapor inlet and outlet openings. The blower 48 is actuated such as by means of a suitable electric motor whereby air and formaldehyde vapor is drawn into the neutralizer housing 42 through the open door 44, the air-formaldehyde mixture passing through beds of unstable ammonium compound and activated charcoal 52 within the panels 50, the vapors then passing through the inner blower closure 46 and then through the air outlet. Thus, air containing formaldehyde vapor within the room or enclosure being decontaminated is circulated through the neutralizer 40 for contact with the beds 52 in the panels 50. It will be understood, of course, that suitable sealing means or baffles are provided so that the air-formaldehyde vapors do in fact pass through the beds 52 and not around the ends or tops of the panels 50. Operation of the neutralizer 40 continues until substantially all of the formaldehyde has reacted with ammonia evolved from the unstable ammonium compound within the bed 52. The co-reactant materials of formaldehyde from the air and ammonia gas evolved from the unstable ammonium compound source will concentrate and react on the activated charcoal surfaces to form a relatively innocuous substance, hexamethylenetetramine. This reaction product is a solid crystalline substance for which the charcoal adsorbent has a high capacity. If the unstable ammonium compound is ammonium carbonate as explained hereafter, the ammonium carbonate decomposition products are carbon dioxide and water, both harmless substances.

The bed 52 within each screen panel 50 of the neutralizer assembly 40 preferably consists of activated charcoal as the adsorbent and ammonium carbonate as the source of co-reactant material (ammonia) in a ratio of from about 10 to about 25 parts by weight of activated charcoal (preferably about 15 parts) to 1 part by weight of ammonium carbonate. Commercial ammonium carbonate is also known as Hartshorn which is actually a mixture of ammonium bicarbonate and ammonium carbamate. The ammonia assay of the latter mixture ordinarily is about 30 to about 34% by weight and this material is the preferred unstable ammonium compound serving as a source of ammonia for evoluation and reaction with formaldehyde and adsorption on the activated charcoal during the neutralizer operation.

Other unstable ammonium compounds that may serve as a source of ammonia include ammonium bicarbonate $NH_4HCO_3$, ammonium carbamate $NH_2COONH_4$ and ammonium carbonate $(NH_4)_2CO_3$. Still other unstable ammonium compounds that may be used include ammonium tartrate, ammonium uranium carbonate and ammonium zirconyl carbonate. Of course, ammonia gas and ammonia water ($NH_4OH$, ammonium hydroxide) may be used but are not as well suited for use in beds such as contained within the panels of the neutralizer assembly 40.

While Applicant does not wish to be bound by any particular theory, it is believed that a complex interrelationship exists with respect to the parameters of (a) ammonium carbonate and activated charcoal particle size, (b) ratio of charcoal to ammonium carbonate, (c) air-vapor flow rate through the beds 52 of the neutralizer 40, and (d) changing (diminishing) concentration of formaldehyde present in the air stream during operation of the neutralizer 40. While the degree of interdependency of these variables is not clearly understood, nevertheless certain fundamental principles enable conclusions to be drawn concerning effects of changing some of these variables as will now be explained.

The preferred embodiment relating to the bed 52 of each panel 50 of the neutralizer 40 includes 6–10 mesh (standard sieve size) activated 50-minute charcoal mixed with ammonium carbonate granules of approximately the same mesh size in a ratio of 15 parts by weight charcoal to 1 part by weight of ammonium carbonate. Air containing 1000 to 2000 parts per million formaldehyde vapor passes through the beds that preferably are about 1½ inch thick at a velocity of approximately 25 feet per minute. Naturally, concentration of formaldehyde in the air is continuously diminished during operation of the neutralizer since the formaldehyde reacts with ammonia.

Reduction of particle size of the bed may increase the bed efficiency but will reduce air flow rate. Increasing the ratio of charcoal to ammonium carbonate likewise may increase bed efficiency. However, no particular advantage in increasing the charcoal to ammonium carbonate ratio or decreasing the particle size has been noted. To optimize these two variables, particle size should be increased and charcoal to ammonium carbonate ratio should be reduced as much as possible to the extent that the bed efficiency is not diminished.

Reducing the particle size of the bed for a given weight increases the exposed surface area of the bed materials. In the case of commercial ammonium carbonate, this reduction in size will increase the rate of ammonia gas generation. However, if the rate of ammonia gas generation is too high, it is not efficiently utilized in reacting with the formaldehyde. Of course, reversing these variables provides the opposite effect.

To reduce the ratio of activated charcoal to ammonium carbonate too greatly will reduce the available adsorptive surface on which the reacting substances adhere, thereby reducing the bed efficiency. Thus, it may be seen that, while variables relating to the bed 52 may be changed, the various considerations discussed above must be taken into account. With regard to ambient conditions in the enclosure or room being treated, it is preferred that temperature in the range of about 70° to about 90° F. and that the relative humidity be maintained in the range of 60–80%.

While it may be possible to combine both the vaporizer assembly 10 and the neutralizer assembly 40 into one physical unit, nevertheless, it is preferred that the two units be separate both for ease of handling and for spacing in the enclosure being treated to promote effectiveness of the sterilization operation. It will be understood, of course, by those skilled in the art that operation of both units may be controlled by suitable control means for which no description is deemed necessary. It should be noted, however, that the control means employed preferably are located outside of the enclosure being treated owing to the physical properties of formaldehyde that is released during the sterilization operation.

By way of example, if the room or enclosure to be treated is 15,000 cubic feet in size, about 1650 grams of 90% paraformaldehyde will generate 1500 grams of formaldehyde gas for effective sterilization of the enclosure. Vaporization with apparatus illustrated in FIGS. 1 and 2 of the drawings will disperse this amount of formaldehyde within about a two-hour period.

After sterilization, formaldehyde concentration must be reduced below five parts per million in order to return the room or enclosure to use for the purpose intended. For a 15,000 cubic foot enclosure, a 550 cubic foot per minute circulation rate through neutralizer 40 results in an air change rate of 2.2 times per hour. At this air change rate, about 80 pounds of material in the neutralizer beds 52 are required at a ratio of 15 parts activated charcoal to 1 part ammonium carbonate to reduce formaldehyde to below 5 parts per million in three to four hours time.

The present invention, therefore, is well suited and adapted to attain the objects and ends and has the advantages and features mentioned as well as others inherent therein. While preferred embodiments of both the method and apparatus system of the present invention have been described and illustrated herein and in the drawings for the purpose of disclosure, numerous changes in the details and arrangements of parts may be made which are within the spirit of the invention as defined by the scope of the appended claims.

What is claimed is:

1. A method of sterilizing a biologically contaminated enclosure including the steps of,
    a. releasing gaseous formaldehyde into the enclosure for contact with contaminants, and
    b. neutralizing the formaldehyde by chemical reaction and physical adsorption by circulation of the gaseous formaldehyde through a bed containing an unstable ammonium compound and activated charcoal.

2. The method of claim 1 wherein the unstable ammonium compound is selected from the group consisting of ammonium carbonate, ammonium carbamate, ammonium bicarbonate, ammonium tartrate, ammonium uranium carbonate, ammonium zirconyl carbonate and mixtures thereof.

3. The method of claim 1 wherein the activated charcoal and the unstable ammonium compound are present in a weight ratio range of from about 10:1 to about 25:1.

4. The method of claim 1 wherein the unstable ammonium compound and the activated charcoal are of about 6 to about 10 mesh in particle size.

5. A method of sterilizing a biologically contaminated enclosure including the steps of,
    a. releasing gaseous formaldehyde into the enclosure for contact with the contaminants by heating and vaporizing paraformaldehyde, and
    b. neutralizing the formaldehyde by chemical reaction and physical adsorption by circulation of the gaseous formaldehyde through a bed containing an unstable ammonium compound and activated charcoal.

6. The method of claim 5 wherein the unstable ammonium compound is selected from the group consisting of ammonium carbonate, ammonium carbamate, ammonium bicarbonate, ammonium tartrate, ammonium uranium carbonate, ammonium zirconyl carbonate, and mixtures thereof.

7. The method of claim 5 wherein in step (b), the formaldehyde chemically reacts with ammonia.

8. The method of claim 5 wherein the unstable ammonium compound and the activated charcoal are present in a weight ratio of about 1:15 and are about 6 to about 10 mesh in particle size.

9. An apparatus system for sterilizing a biologically contaminated enclosure, comprising,
    a. means for vaporizing and disperisng formaldehyde into the enclosure for contact with contaminants, and
    b. neutralizer means for chemically reacting the dispersed formaldehyde and adsorbing the reaction products thereof, the neutralizer means including:
        i. a sealable housing having an openable vapor inlet door and an openable vapor outlet door, which doors open only when the neutralizer means is in use,
        ii. at least one granular bed of an unstable ammonium compound and activated charcoal, the bed being contained within the housing (b) (i) between the vapor inlet door and the vapor outlet door, and arranged so that formaldehyde vapor entering the inlet passes through the bed where it is chemically reacted and absorbed, and iii. blower means for moving the vapor into the neutralizer means and through the bed (ii).

10. The apparatus system of claim 9 wherein the activated charcoal and the unstable ammonium compound are present in a weight ratio range of from about 10:1 to about 25:1.

11. The apparatus system of claim 9 wherein the unstable ammonium compound and the activated charcoal are of about 6 to about 10 mesh in particle size.

12. The apparatus system of claim 9 wherein the unstable ammonium compound and the activated charcoal are present in a weight ratio of about 1:15 and are of about 6 to about 10 mesh in particle size.

* * * * *